Patented Oct. 24, 1939

2,177,598

UNITED STATES PATENT OFFICE 2,177,598

MANUFACTURE AND APPLICATION OF AGENTS FOR COMBATING RODENTS

Paul Herzig and Hans Kükenthal, Leverkusen I. G. Werk, Germany, assignors to Winthrop Chemical Company, Inc., New York, N. Y., a corporation of New York No Drawing. Application January 5, 1939, Serial No. 249,376. In Germany February 4, 1936

3 Claims. (Cl. 167—46)

This invention relates to the manufacture and application of agents for combating rodents.

The hitherto known agents for combating rodents which have been used as stomach poisons were based upon flour occasionally admixed with plant lecithin and fat. Such bases suffer from the disadvantage that they are liable to decompose. Fat easily gets rancid and ill-smelling whereas flour—if worked up into a paste—is easily decomposed by fungi and bacteriae. If preserving agents are added one runs the risk that the animals to be killed do not eat such a preparation. As sugar, which has also been proposed as base for such agents, is hygroscopic the preparations based thereupon easily deliquesce. Rodenticides which have been put on the market in cake-like shapes involve the disadvantage of drying up and hardening so that the rodents hardly take them.

It has now been found that watersoluble cellulose derivatives, especially those selected from the group consisting of methylcellulose and hydroxy alkylated cellulose derivatives are very well suited as base for rodenticides which are used as stomach poisons.

The above named cellulose derivatives are particularly suited for combating rats and mice. It has already been proposed to ground fungicides and insecticides with methylcellulose and filling agents to dry powdery mixtures for the manufacture of seed grain disinfectants and insecticides. Such agents serve for instance for combating caterpillars. As caterpillars already eat the poison without baits it could not be foreseen that rodents for the destruction of which the selection of the bait is very important would take the agents according to the present invention. This was the more astonishing as rodents generally can only be allured by victuals whereas the said cellulose derivatives cannot be looked upon as foodstuffs.

The following pastes have proved to be particularly suitable:

| | Kilograms |
|---|---|
| Methylcellulose | 7.50 |
| Thalliumsulfate | 2.50 |
| Green dyestuff | 0.05 |
| Water | 89.95 |
| Methylcellulose | 7.00 |
| Barium carbonate | 10.50 |
| Green dyestuff | 0.05 |
| Water | 82.45 |
| Hydroxyethyl-methylcellulose | 3 |
| Phosphorus | 2 |
| Melted tallow | 40 |
| Water | 50 |
| Hydroxyethylated cellulose ethane sulfonic acid sodium | 12 |
| Potassium dinitro-cresolate | 10 |
| Water | 88 |
| Glycol-glycolic acid-methyl-ester cellulose ether | 5 |
| Thallium sulfate | 2.5 |
| Dyestuff | 0.05 |
| Water | 95 |

These substances are admixed to the bait in the usual manner.

We claim:

1. A rodenticide acting as a stomach poison comprising as carrier for the poison used a water-soluble cellulose derivative selected from the group consisting of methyl cellulose and hydroxyethylated celluloses.

2. A rodenticide acting as a stomach poison comprising methylcellulose as carrier for the poison used.

3. A rodenticide acting as a stomach poison comprising hydroxyethyl cellulose as carrier for the poison used.

PAUL HERZIG.
HANS KÜKENTHAL.